Nov. 24, 1959  H. H. CHAMBERLAIN  2,914,712
ELECTRIC INSTRUMENT
Filed April 1, 1955

Inventor:
Harvey H. Chamberlain
by, Richard E. Hurley
His Attorney 2,914,712
Patented Nov. 24, 1959

United States Patent Office 2,914,712

ELECTRIC INSTRUMENT

Harvey H. Chamberlain, Marblehead, Mass., assignor to General Electric Company, a corporation of New York Application April 1, 1955, Serial No. 498,729

2 Claims. (Cl. 317—156)

My invention relates to electric instruments and has particular application to contact making instruments and similar devices wherein the indicating mechanism of the instrument is required to move a contact, demand indicating device or the like along the instrument scale to close an electrical circuit at some predetermined point or to indicate a maximum reading.

It is a principal object of my invention to provide an improved instrument of the aforementioned type in which the movable contact or similar movable element may be caused to move by means of a relatively small actuating signal.

It is another object of my invention to provide an improved instrument of the aforementioned type in which a vibratory or oscillatory signal is superimposed on the actuating signal which normally causes deflection of the instrument mechanism, the vibratory signal thereby permitting movement of a contact or other movable element by means of a relatively small or weak actuating signal.

It is a further object of my invention to provide an improved electric instrument of the type adapted to be actuated by a direct current signal to move a contact making device or the like, in which instrument an alternating current is superimposed on the direct current signal to yield a vibratory motion of the instrument movement thereby increasing the sensitivity of the instrument to direct current actuation.

In carrying my invention into effect, I provide, in accordance with one embodiment thereof as applied to a direct current contact making instrument, a vibratory stimulus, such as an alternating voltage, applied to the instrument movement and superimposed on the direct current actuating signal. The resulting vibratory movement of the instrument movement permits it to move an electrical contact or the like against a considerably heavier force than would be possible with the direct current signal alone, since the vibratory force alternately adds to the force developed by the direct current signal to yield corresponding pulses of force comprising a summation of the vibratory and direct curent signals. In this manner the sensitivity of the instrument to direct current stimulus is increased. The frequency of the vibratory stimulus is selected such that the corresponding vibratory movement of the pointer sweeps only a very small portion of the scale, thus permitting the scale indication of the pointer to be visually detected without difficulty.

Figure 1:
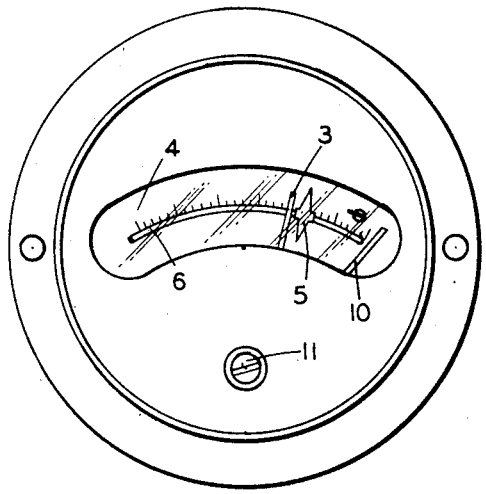
Figure 2:
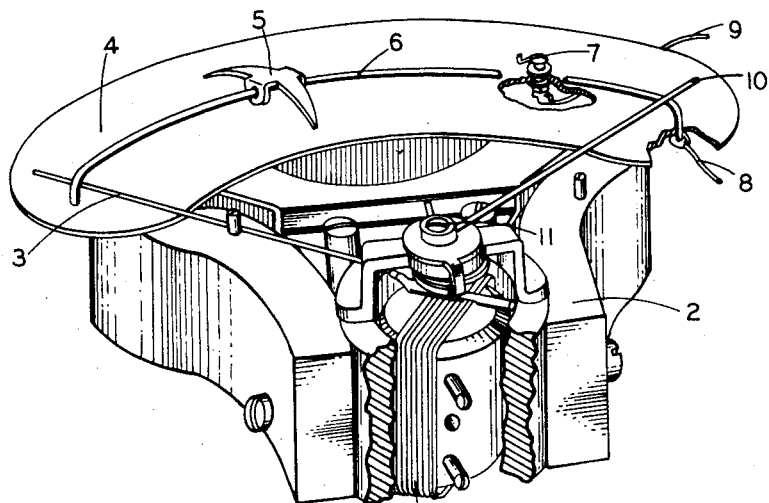
Figure 3:
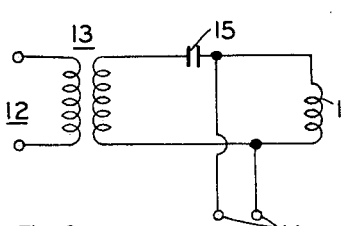
Figure 4:
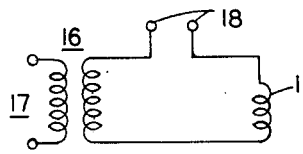

In the drawing, Fig. 1 is a front view of an electrical indicating and contact making instrument embodying my invention; Fig. 2 is a perspective cutaway view of the internal mechanism of the instrument shown in Fig. 1; while Figs. 3 and 4 are schematic circuit diagrams indicating two alternative arrangements for superimposing an alternating voltage on the direct current actuating signal of the instrument.

Referring now in particular to Figs. 1 and 2, the instrument illustrated is of the moving coil type and comprises a deflectably mounted coil 1 positioned in a magnetic field set up by a permanent magnet 2. The deflection mechanism of the instrument is adapted for actuation by a unidirectional current flowing in the coil 1 and it will be seen that a pointer 3 is attached to the coil so as to be deflectable therewith to sweep a scale portion 4.

An element 5 is mounted so as to be movable along a guide, such as a wire 6, responsive to deflection of the coil 1. It will be observed that the movable element 5 is positioned to be engaged by the pointer 3 to permit movement of the element 5 in one direction upon deflection of the coil 1.

The element 5 is, in the present embodiment an electrical contact member adapted to complete, upon engagement with a stationary contact 7, an electrical circuit extending from a conductor 8 through the wire 6 and the contact 7 to a second conductor 9. As illustrated in the scale cutaway portions of Fig. 2, the conductors 8 and 9 are attached in any suitable manner, such as by being soldered, to the wire 6 and the terminal 7 respectively.

The element 5 also serves as a maximum demand indicator since it is movable in only one direction by the pointer 3 and hence always remains at the point of maximum deflection. The element 5 may be reset by means of a sweep member 10 which is movable responsive to adjustment of a screw 11 accessible from the exterior of the instrument as shown in Fig. 1.

My invention contemplates the application of a vibratory force to the deflection mechanism of the instrument, which vibratory force, during alternate half cycles, adds to the unidirectional actuating current flowing in coil 1 to yield a pulsating force available for movement of the element 5, which pulsating force represents a summation of the vibratory and unidirectional force components. In addition, the vibratory movement of the deflection mechanism permits utilization of the stored inertia of the mechanism to assist in movement of the element 5. In the embodiment of my invention illustrated, I apply this vibratory force by superimposing an alternating current on the unidirectional current which actuates the coil 1.

The alternating current component, having no net unidirectional component does not disturb the steady state deflection point of the instrument, except for a relatively small error caused by flutter or vibration of the pointer back and forth over the point of mean deflection. It was found, for instance, that the error introduced when a 60 cycle alternating current was superimposed on the unidirectional current actuating the coil 1, was less than 2% of full scale deflection, which is within range normally considered acceptable for instruments of this type.

The alternating current component may be superimposed on the unidirectional current component and applied to the deflection mechanism of the instrument in any manner. By way of example, I have illustrated, in Figs. 3 and 4, two circuit arrangements for accomplishing such a purpose.

In the circuit illustrated in Fig. 3, the alternating current is derived from any suitable source 12, the voltage of which may be suitably stepped down, if such is necessary, by means of a transformer 13. The alternating voltage thus derived is applied to the instrument coil 1 in parallel with the unidirectional actuating signal which is applied across terminals 14. A blocking condenser 15 is provided to prevent shunting the unidirectional signal through the transformer 13.

Referring now to Fig. 4, which illustrates an arrangement alternative to that of Fig. 3, it will be seen that the alternating voltage is derived in the same manner as in the arrangement shown in Fig. 3, that is through a transformer 16 connected to a source 17. In the circuit of Fig. 4, however, the unidirectional actuating signal is applied across terminals 18 in series with the alternating current component, rather than in parallel as is the case with the arrangement of Fig. 4.

It will be seen that the arrangement of Fig. 4 is satisfactory where the internal impedance of the actuating source, that is the impedance between terminals 18, is low enough to allow passage of a sufficient alternating current component to cause the desired intensity of vibration. In cases where the internal impedance of the actuating source is very high, the circuit of Fig. 4 may, in certain instances, be employed without utilizing the transformer 16.

It will be seen that various modifications of the circuits of Figs. 3 and 4 may be employed. For instance, the transformer 13 of Fig. 3 may be eliminated and a series resistor may be employed, the requirement being that the resistor be of sufficient size to limit the alternating current component to the desired level. Similar modifications may be made in the circuit of Fig. 4.

And it will be realized also that various arrangements other than those shown in Figs. 3 and 4 may be employed for the purpose of applying a vibratory stimulus to the instrument deflection mechanism without departing from the true scope or spirit of my invention in its broader aspects.

What I claim as new and desire to secure by Letters Patent of the United States is:

1. An electric instrument comprising a coil mounted in a magnetic field so as to be deflectable in one direction upon energization thereof by a unidirectional current flow therein, a scale, a pointer movable over said scale and attached to said coil for deflection therewith, an electrically conductive guide extending along said scale, an element mounted on said guide to be engaged by said pointer for movement in one direction along said guide, a contact contiguous to said guide, a sweep member movable over said scale for resetting said element, and means for applying an alternating current voltage to said coil in circuit with a source of supply of said unidirectional current, said coil, said pointer and the movable mechanism associated therewith having an inertia which, relative to the propelling force of said coil resulting from current flow therein from said alternating current voltage, permits a limited back-and-forth motion of said pointer where it engages said element mounted on said guide, whereby said deflectable means is enabled to overcome the friction between said movable element and said guide at lower values of unidirectional current in said coil than by use of the unidirectional current alone.

2. An electric instrument capable of indicating maximum direct current readings and closing an electrical circuit at a predetermined maximum amount comprising, a coil mounted in a magnetic field so as to be deflectable in one direction upon energization thereof by a unidirectional current flow therein, a scale, an electrically conductive guide wire extending along said scale, a pointer movable over said scale and attached to said coil for deflection therewith, an element mounted on said guide in electrical conductive relationship thereto and adapted to be engaged by said pointer for movement in one direction along said guide, a contact contiguous to said guide wire and so positioned as to be contacted by said movable element to close an electrical circuit between said guide wire and said contact, and means for applying an alternating current voltage to said coil in circuit with a source of supply of said unidirectional current being measured, whereby the propelling force of said coil resulting from current flow therein permits a limited back-and-forth motion of said pointer in the region where it engages said element mounted on said guide to assist in the movement of said movable element.

References Cited in the file of this patent

UNITED STATES PATENTS

| | | |
|---|---|---|
| 724,724 | Mitchell | Apr. 7, 1903 |
| 1,187,334 | Keppler | June 13, 1916 |
| 1,301,412 | Elmen | Apr. 22, 1919 |
| 2,505,730 | Betz | Apr. 25, 1950 |
| 2,549,190 | Gilchrist | Apr. 17, 1951 |
| 2,827,610 | Hiser | Mar. 18, 1958 |

FOREIGN PATENTS

| | | |
|---|---|---|
| 329,852 | Great Britain | May 29, 1930 |
| 1,056,127 | France | Oct. 21, 1953 |
| 720,246 | Great Britain | Dec. 15, 1954 |